(12) United States Patent
Lee et al.

(10) Patent No.: US 9,851,577 B2
(45) Date of Patent: Dec. 26, 2017

(54) NANO-STRUCTURED LENS FOR COLLIMATING LIGHT FROM SURFACE EMITTERS

(71) Applicant: DiCon Fiberoptics, Inc., Richmond, CA (US)

(72) Inventors: Jeffrey Lee, El Sobrante, CA (US); Ho-Shang Lee, El Sobrante, CA (US)

(73) Assignee: DICON FIBEROPTICS, INC., Richmond, CA (US)

( * ) Notice: Subject to any disclaimer, the term of this patent is extended or adjusted under 35 U.S.C. 154(b) by 168 days.

(21) Appl. No.: 14/873,713

(22) Filed: Oct. 2, 2015

(65) Prior Publication Data

US 2017/0017091 A1 Jan. 19, 2017

Related U.S. Application Data

(60) Provisional application No. 62/193,744, filed on Jul. 17, 2015.

(51) Int. Cl.
| | |
|---|---|
| *G02B 27/30* | (2006.01) |
| *F21V 5/04* | (2006.01) |
| *G02B 3/00* | (2006.01) |
| *F21V 5/00* | (2015.01) |
| *G02B 21/06* | (2006.01) |

(52) U.S. Cl.
CPC ............... *G02B 27/30* (2013.01); *F21V 5/002* (2013.01); *G02B 3/0087* (2013.01); *G02B 21/06* (2013.01)

(58) Field of Classification Search
CPC ...... G02B 3/0087; G02B 21/06; G02B 27/30; H01L 33/58; H01L 33/60; H01L 33/405; H01L 33/42; F21V 5/002; F21V 5/003; F21V 5/004; F21V 5/005
USPC ......................................................... 362/330
See application file for complete search history.

(56) References Cited

U.S. PATENT DOCUMENTS

| | | | | |
|---|---|---|---|---|
| 6,587,620 B2 * | 7/2003 | Koyama | ................ | B82Y 20/00 257/79 |
| 6,871,982 B2 * | 3/2005 | Holman | ................ | G02B 5/045 257/E33.072 |
| 7,315,419 B2 * | 1/2008 | Taira | .................... | G02B 5/1814 359/569 |
| 7,989,239 B2 * | 8/2011 | Im | ........................... | H01L 33/42 257/E21.001 |
| 2006/0066230 A1 * | 3/2006 | Kubota | ............... | H01L 51/5268 313/506 |

(Continued)

*Primary Examiner* — Alan Cariaso
(74) *Attorney, Agent, or Firm* — Vierra Magen Marcus LLP

(57) ABSTRACT

A light source for providing light comprises a light emitting layer and a lens comprising a periodic structure therein that is periodic along at least one direction in a plane. The structure includes or is formed from at least two optically transparent materials of different optical indices. The lens is separated from the light emitting layer, and the radiation propagating from the light emitting layer within an angle to a line normal to the plane will be transmitted by the lens to a far field in an index-guided mode. The separation between the light emitting layer and the lens is such that near field radiation propagating from the light emitting layer towards the lens not within said angle to the line will be scattered and redirected by the first lens to the far field to thereby collimate the radiation propagating from the light emitting layer to the far field.

32 Claims, 11 Drawing Sheets

(56) References Cited

U.S. PATENT DOCUMENTS

| | | | |
|---|---|---|---|
| 2011/0141395 A1* | 6/2011 | Yashiro | G02B 6/0036 349/62 |
| 2012/0087007 A1* | 4/2012 | Suganuma | G02B 5/1809 359/572 |
| 2016/0061391 A1* | 3/2016 | Inoue | H01L 33/505 362/84 |
| 2016/0301188 A1* | 10/2016 | Mathai | H01S 5/18363 |

* cited by examiner

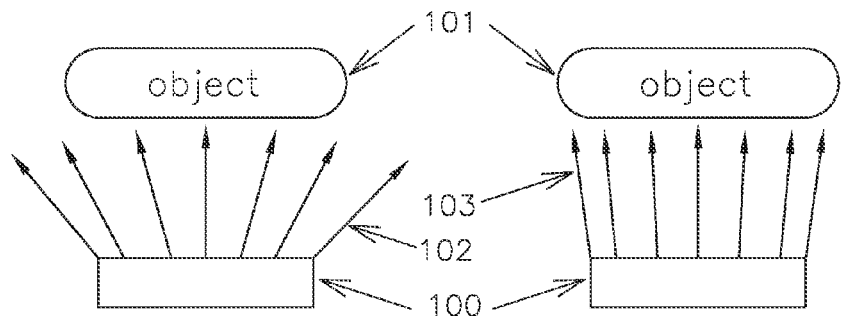
Fig. 1A1–Prior Art    Fig. 1A2–Prior Art
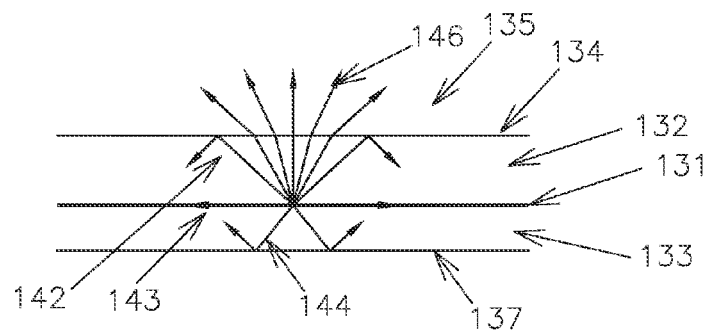
Fig. 1B–Prior Art
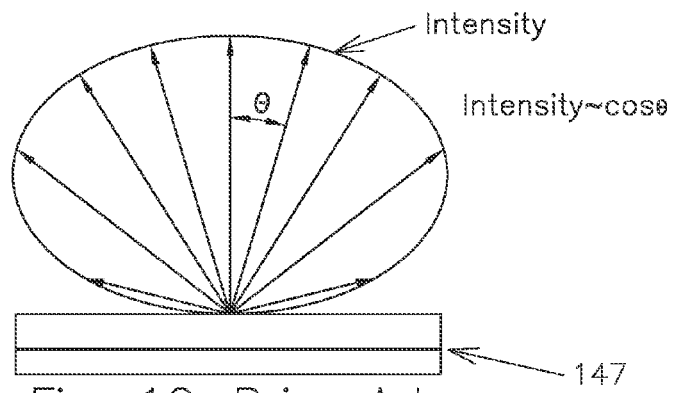
Fig. 1C–Prior Art
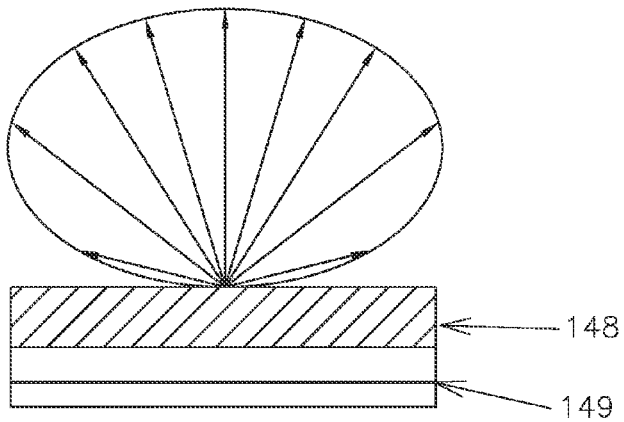
Fig. 1D–Prior Art

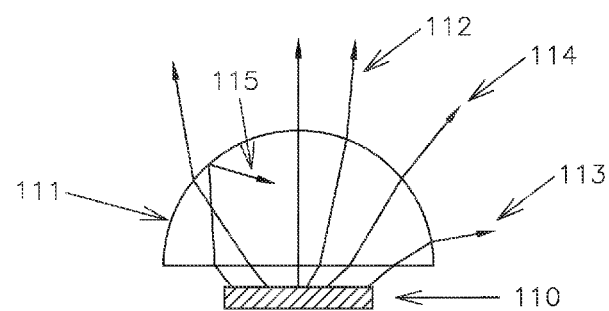
Fig. 1E—Prior Art
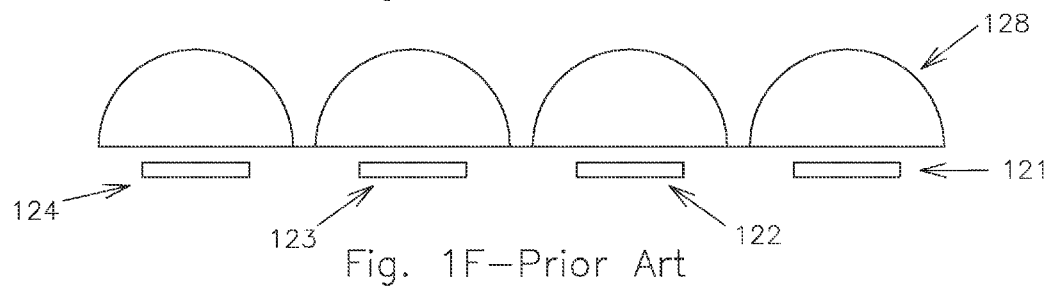
Fig. 1F—Prior Art
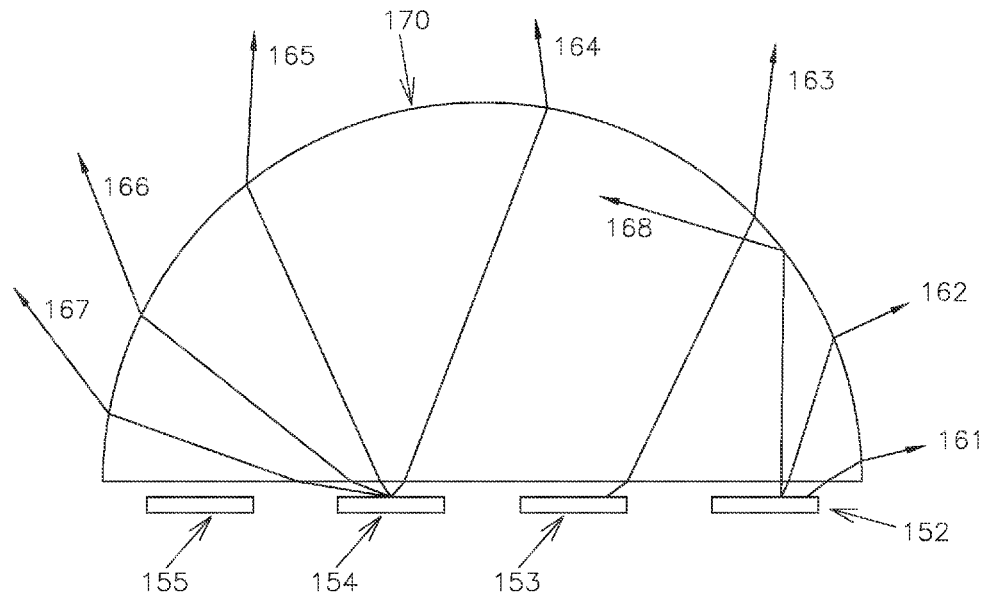
Fig. 1G—Prior Art

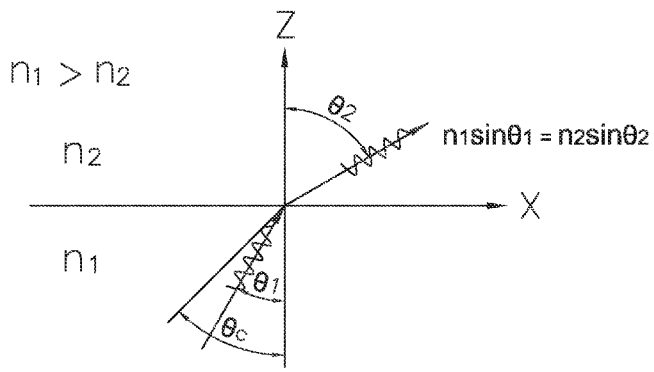
Fig. 2A—Prior Art
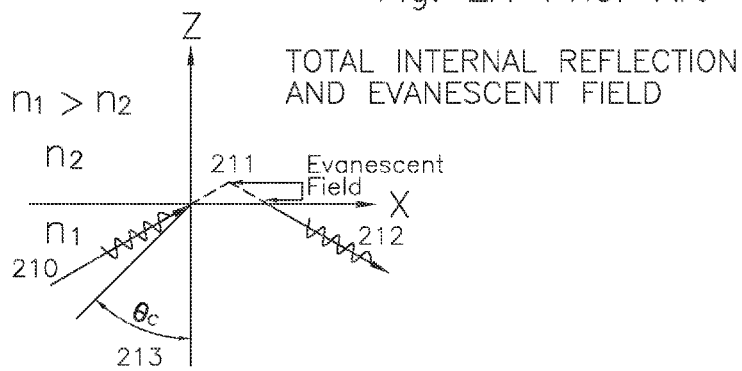
Fig. 2B—Prior Art
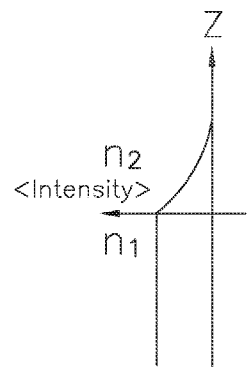
Fig. 2C—Prior Art
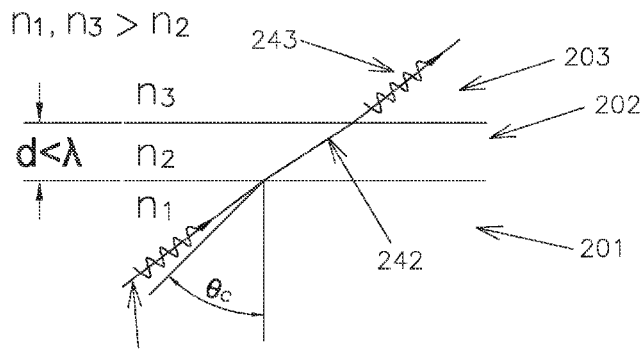
Fig. 2D—Prior Art
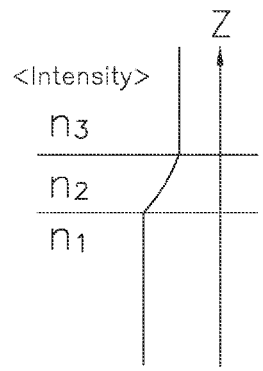
Fig. 2E—Prior Art

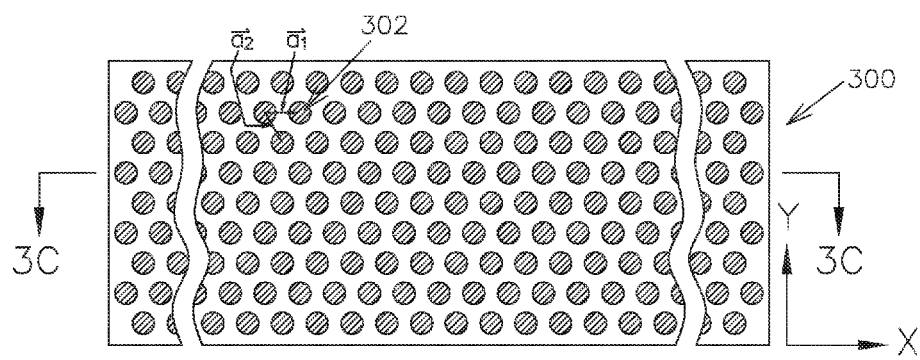
Fig. 3A
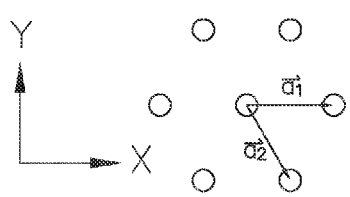
Real Space
Fig. 3B1
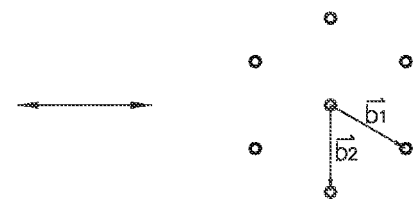
Reciprocal (Momentum) Space
Fig. 3B2
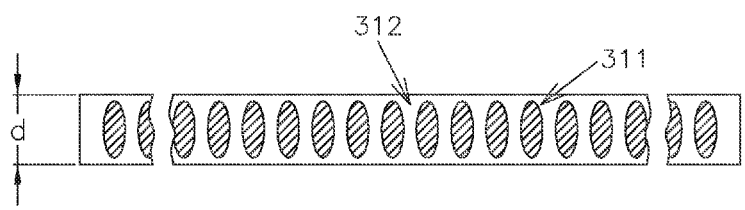
Fig. 3C $|\vec{k}_1| = |\vec{k}_2|$ Energy Conservation

NANO-STRUCTURED LENS FOR COLLIMATING LIGHT FROM SURFACE EMITTERS

CROSS-REFERENCE OF PATENT APPLICATION

This application claims priority from U.S. Provisional Application No. 62/193,744, filed Jul. 17, 2015, which application is incorporated herein in its entirety by this reference.

BACKGROUND

This invention relates generally to an optical lens with patterned nano-structures that collimates light from a light-emitting surface in close proximity.

The use of light is ubiquitous and can be found in applications ranging from image capture, microscopy and telecommunications, as just three examples. Efficiently directing light towards the object(s) of interest typically requires collimating the light, which has for centuries been achieved using lenses. The further the distance to the object to the illuminated, the longer the distance the light has to propagate and the more collimated it has to be. Lenses are traditionally curved glass surfaces which collect light distributed over a range of angles and redirect it to have different angles. This is explained by the principle of refraction in which light travels at different speeds in materials of different index of refraction. As light crosses through a material interface at an oblique incident angle, it will bend towards or away from the angle that is normal to the interface surface, if the latter material has a larger or smaller index of refraction, respectively. The physics are well described by a 'ray-optics' treatment commonly taught in high school, in which only a few parameters such as the wavelength, the lens material's index of refraction, and the overall geometry are considered (ref. Snell's Law). The ray-optics treatment, and hence design and application, relies on the assumption that the curvature of the lens is large compared to the wavelength and beam size. Typically, light from a source is collimated by placing the source at the focal distance from the lens. Light emitted from most sources such as bulbs, Light Emitting Diodes (LEDs), and Organic LEDs spreads as it propagates and thus lenses designed for these sources typically need to be much larger than the light source, in order to maximize light collection efficiency. The restrictions imposed by these bulky lenses have therefore conventionally limited their use to "far-field" imaging, where only light emitted from the light source at small incident angles to the lens is able to propagate an appreciable distance. Light that is going straight, i.e. having a zero angle relative to the optical axis, can propagate further than light at higher angles. High-angle light that enters the lens either undergoes internal reflection and does not propagate at all, or else it is not sufficiently collimated, so that it is still at a high angle as it exits the lens, and propagates only a short distance.

SUMMARY OF THE INVENTION

Utilizing the light power contained in the "near-field" can dramatically increase efficiency, which has synergistic benefits such as being able to reduce power usage, heat generation, cost, and size. LEDs are an attractively compact, inexpensive, and reliable light source, but as with light bulbs, their applications typically require the use of collimating and other optical light shaping elements. The light distribution from a surface emitter, such as an LED, follows a Lambertian profile in which the power over a small solid angle is proportional to cosine of the angle between the solid angle and the surface normal. Using bulky geometric lenses that are generally several times the size of the source, reduces the compactness benefits of LEDs. Large lenses are also expensive to manufacture because their curvature must be precise and polished to a smooth optical-grade finish. There is, therefore, a strong demand for an alternative means of collimating light which is compact, inexpensive, and more fully utilizes the power contained in the near-field. Collimating the light immediately after it exits a surface emitter can limit the beam width and spread, and therefore allows for smaller optical light shaping elements such as geometric lenses, to be used as necessary further down the light path, thereby reducing overall size and cost.

One embodiment of the invention is directed to a light source for providing light, which comprises a light emitting layer; and a first lens comprising a periodic structure therein that is periodic along at least one direction in a plane. The structure includes or is formed from at least two optically transparent materials of different optical indices. The first lens is separated from the light emitting layer, and the radiation propagating from the light emitting layer within an angle to a line normal to the plane will be transmitted by the first lens to a far field in an index-guided mode. The separation between the light emitting layer and the lens is such that near field radiation propagating from the light emitting layer towards the lens not within said angle to the line will be scattered and redirected by the first lens to the far field to thereby collimate the radiation propagating from the light emitting layer to the far field.

Another embodiment of the invention is directed to a light source for providing light, comprising a light emitting layer and a lens comprising a second layer with a periodic structure therein that is periodic along at least one direction in a plane. The structure comprises at least two optically transparent materials of different optical indices, wherein the radiation propagating from the light emitting layer within an angle to a line normal to the plane will be transmitted by the second layer to a far field in an index-guided mode, and near field radiation propagating from the light emitting layer towards the second layer not within said angle to the line will be scattered and redirected by the lens to the far field to thereby collimate the radiation propagating from the light emitting layer to the far field.

Yet another embodiment of the invention is directed to a method for collimating light to a far field, comprising providing a first layer with a periodic structure therein that is periodic along at least one direction in a plane. The structure comprising at least two optically transparent materials of different optical indices. The method further includes propagating radiation towards the first layer, so that the radiation propagating within an angle to a line normal to the plane towards the layer will be transmitted by the first layer to the far field in an index-guided mode, and near field radiation propagating not within said angle to the line towards the first layer will be scattered and redirected by the first layer to the far field to thereby collimate the near field radiation to the far field.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

BRIEF DESCRIPTION OF THE DRAWINGS

FIGS. 1A1 through 1D illustrate the typical light emission from surface emitters. FIG. 1A1 is a schematic view of a surface emitter emitting light without collimation, and FIG. 1A2 is a schematic view of a surface emitter emitting light with collimation. A comparison between FIGS. 1A1 and 1A2 illustrates how collimation increases efficiency and power by decreasing the high-angle light such that more light illuminates the object. FIG. 1B illustrates emitted light from a Light Emitting Diode (LED) as an example of a surface emitter. FIGS. 1C and 1D illustrate the closely approximated Lambertian emission intensity profile from a bare LED chip, and an LED chip with stimulated phosphor layer, respectively.

FIGS. 1E, 1F, and 1G illustrate prior art and conventional embodiments of collimating lenses, using curved high-index material to refract light for one or several light emitting surfaces.

FIG. 2A illustrates refraction and Snell's Law. FIGS. 2B and 2C show total internal reflection at incident angles greater than the critical angle and the static evanescent field which exists at the interface but which is quickly attenuated at greater distances from the interface. FIGS. 2D and 2E show how light is able to "tunnel", or have its power coupled, across a thin, low index material or a thin, low index medium such as air, into a high index material through which it propagates.

FIG. 3A is a top view of an embodiment of the present invention in which high index pillars are periodically arranged in a triangular lattice within a lower index material or medium. FIG. 3B1 illustrates the lattice vectors and FIG. 3B2 illustrates the reciprocal vectors from the triangle lattice in FIG. 3A. FIG. 3C is a cross-sectional view of FIG. 3A taken along the line 3C-3C in FIG. 3A.

FIG. 5A is a perspective view of a nano-structured lens in the preferred orientation relative to the desired light propagation direction along the z axis or direction. FIG. 5B illustrates how incoming light is scattered by the nano-structured lens. FIG. 5C shows, mathematically, the reciprocal lattice vector of the regularly patterned nano-structure of FIGS. 5A and 5B being added to the wave vector of the incident wave. FIG. 5D indicates the resulting wave vector from FIG. 5C, in which the light is more collimated than it was before passing through the nano-structured lens.

FIG. 6A is a cross-sectional view of an embodiment which depicts generally how the nano-structured lens is juxtaposed to an arbitrary surface light emitter such as an LED. FIGS. 6B and 6C illustrate embodiments where the surface light emitter is excited by a solid-state emitter such as an LED and light bulb, respectively. FIG. 6D is a cross-sectional view of an embodiment in which phosphors or light emitting particles are embedded in preferably high index gel in physical contact with, and located between a solid-state emitter and the nano-structured lens. FIG. 6E illustrates the collimating effect of the nano-structured lens, in comparison to a surface emitter light source without said lens.

DETAILED DESCRIPTIONS OF THE PREFERRED EMBODIMENTS

Figure 4A:
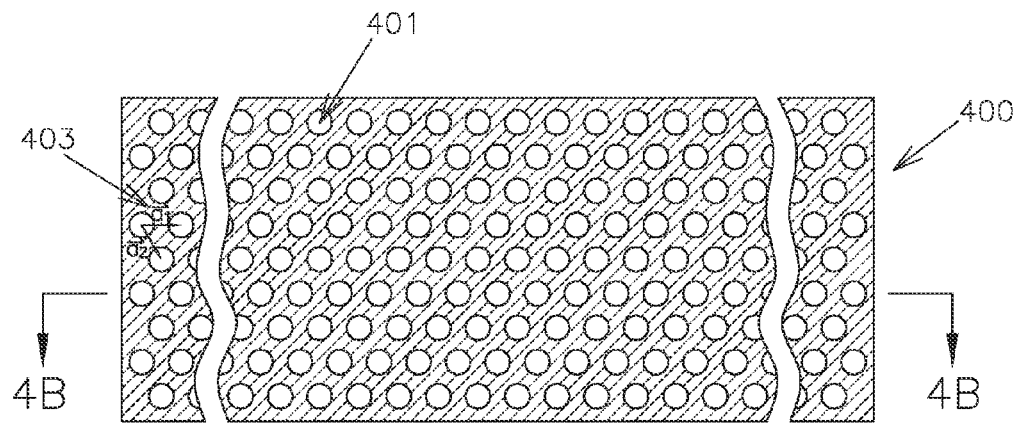
FIG. 4A is a top view of another embodiment of the present invention in which low index pillars or holes are periodically arranged in a triangular lattice within a higher index material.

The present invention utilizes one or more patterned nano-structures which act as a compact lens to efficiently collimate the otherwise spread emission from a light emitting surface, by coherently scattering high-angle light that would be typically wasted with geometric lenses, in the forward direction. Referred to hence forth as a "nano-structured lens", the present invention's primary functional advantages over geometric lenses are that it is more able to collimate high-angle light and can be placed close to the light emitting surface, to couple energy from the near-field. The nano-structured patterns form a roughly one-dimensional or two-dimensional lattice of index contrast and can be simplistically viewed as an array of holes or higher index pillars in a preferably transparent, low loss medium that is several wavelengths thick. The resulting light pattern in the far-field is the collective interference pattern created by a large number of scattering centers arranged in a regular pattern, in addition to the contribution from low angle light. Light at small angles, including zero angle, propagates along through the length or thickness of the nano-structures and perpendicular to the pattern in confined waveguide modes, before exiting and propagating to the far-field. These small-angle modes, including the zero angle mode, are referred to as "index-guided modes" as they are guided along the length or thickness of the structures, such as in a waveguide. In contrast, high-angle light in geometric lenses will tend to either leave the lens at a high angle, or undergo total internal reflection within the lens, both of which do not allow it to propagate forward to the far-field. These limitations do not apply to the present invention, in which scattering is used to redirect high-angle light in the forward direction. Furthermore, by placing the nano-structured lens within a few optical wavelengths of the light source, preferably less than $\lambda/4$, energy from the evanescent field generated just beyond the surface of the light emitting surface, i.e. near-field radiation, can be coupled and redirected to the far field. This is not possible with geometric lenses which are typically placed too far from the light emitting surface to allow for near-field coupling.

The near field (or near-field) and far field (or far-field) are regions of the electromagnetic field around an object, such as a transmitting antenna, or the result of radiation scattering off an object. Non-radiative 'near-field' behaviors of electromagnetic fields dominate close to the antenna or scattering object, while electromagnetic radiation 'far-field' behaviors dominate at greater distances. Near-field effects are evident typically only within a few wavelengths of the radiation, beyond which is the far field.

The regular patterned structure of the nano-structured lens of the present invention imparts a momentum change to the light in a direction along the two-dimensional plane defined by the lattice vectors. This momentum, $\vec{b}$, is known as the reciprocal lattice of the structure lattice and is the latter's Fourier transform and representation in momentum space. It cancels out some of the light's momentum, $\vec{k}$, along that direction. In the preferred orientation where the nano-structured lens lattice is perpendicular to the light propagation direction $\vec{k}_{\parallel}$, momentum, $\vec{b}$, will cancel some of the light's transverse momentum, $\vec{k}_{\perp}$. By conservation of energy, the total length of the light's momentum vector $\vec{k}$ is conserved, such that the resulting momentum will have a smaller $\vec{k}_{\perp}$ and hence smaller angle with respect to the normal of the nano-structured lattice.

The strength of the momentum change imparted by the nano-structured surface depends on the lattice spacing or pitch, as well as lattice regularity. Since the momentum vector is the Fourier transform of the structure lattice, a smaller structure vector will yield a larger momentum vector. A more regular and repeated pattern will exhibit more coherence scattering and hence a larger momentum. Irregularities can be thought of as defects that reduce coherence. The actual shape of the scattering centers is important but less so than the structure lattice and can range from circles to ovals when viewing the cross section, to more intricate and less round shapes such as triangles. Furthermore, these scattering centers can be of higher or lower index of refraction than their surrounding substrate or medium.

Light emission from surface emitters, such as commonly used LEDs, spreads outward and often requires additional collimation to effectively illuminate an object some distance away. FIGS. 1A1 through 1D describe the spread distribution of light from surface emitters. FIG. 1A1 is a schematic view of a surface emitter emitting light without collimation, and FIG. 1A2 is a schematic view of a surface emitter emitting light with collimation. A comparison between FIGS. 1A1 and 1A2 illustrates how collimation increases efficiency and power by decreasing the high-angle light such that more light illuminates the object. Without additional collimation, light emitted from a surface emitter 100 in FIG. 1A1 will contain high-angle components 102 which diverge as they propagate and cannot illuminate the object 101. Collimation is the act of decreasing these angles and sending light more in the forward direction 103 as shown in FIG. 1A2. Collimation is typically performed by means of a lens not shown in FIG. 1A2.

In the LED shown in FIG. 1B, the injection of electrical current through the sandwiched p-doped and n-doped semiconductor materials 132 and 133, respectively, will cause the diode so formed to emit light in all directions at the p-n junction 131. The emission pattern can be modeled as dipole emission. A reflective surface 137 is often used on one side of the device to direct most of the emission (for example, ray 144) to be out of one surface 134. Some of the light, such as ray 146, will be emitted into the surrounding medium 135, while other portions of the light emission will undergo internal reflections, as shown with ray 142, and will be trapped within the device. Due to the high index of refraction of semiconductor materials, only a small portion of the emission, for example ray 146, is able to escape the device. As shown in FIG. 1C, the surface emission profile ultimately closely resembles a Lambertian profile in which the power over a small solid angle is proportional to the cosine of the angle θ between the solid angle and the surface normal of the LED 147. As shown in FIG. 1D, layer(s) of phosphor 148 are often added to the top of an emitter such as LED 149, to change the wavelength(s) of the emitted light. This form of LED can also be modeled as a light emitting surface with a Lambertian surface emission profile.

The present invention is based on the use of a patterned nano-structure to collimate light via coherent scattering, as opposed to refraction. Conventional geometric lenses, typically made of glass, which utilize refraction (based on the principle that light travels at different speeds in different mediums, and this results in bending at interfaces) are typically poor at collimating high-angle light, and curvature restraints result in their being large in size. The bending of light that is incident to an interface between materials of different index of refraction is described by Snell's Law. Snell's Law, and the use of the principles of refraction to bend and collimate light, is only applicable when the radius of curvature is large compared to the beam size and wavelength. This limits the amount of curvature that a geometric lens can have, its minimum focal length, and hence how close it can be to the light source, since collimation is usually best when the light source is placed one focal length from the lens. FIG. 1E illustrates a typical prior art geometric lens 111, used to collimate light emitted from a surface 110. Because light from surface emitters is not collimated, but instead spreads, lenses must typically have diameters that are several times that of the light emitter, in order to capture most of the light. Low-angle beams 112 and 114 are reasonably well collimated and are within the usable angular range of the lens. The governing equations are greatly simplified when using a small angle approximation. Higher angle light, however, either exits the lens (but still at a high angle), as shown in 113, or undergoes total internal reflection and does not exit the lens, as shown in 115.

FIG. 1F shows another embodiment of the prior art, with an array of surface emitters 121 through 124, and a complementing array of geometric lenses 128 to collimate the light. FIG. 1G shows a prior art array of surface emitters 152 through 155, that share the same lens. Although being somewhat different in design, both of these prior art embodiments suffer from being large in size, and also being poor at collimating high angle light 113, 115, 161, 162, 166, 167, because they both utilize geometric lenses.

The principles of refraction and total internal reflection that are depicted in the previous figures are described in more detail in FIGS. 2A-2E. As light passes through a material interface at an oblique incident angle, it will bend towards or away from the angle normal to the interface, depending on the index of refraction as described by Snell's Law: $n_1 \times \sin(\theta_1) = n_2 \times \sin(\theta_2)$, where $n_1$ and $n_2$ are the indices of refraction. FIG. 2A illustrates an example where light enters from $n_1$ (higher index) into $n_2$ (lower index, typically air) and bends away from the surface normal, which in this and all subsequent figures is in the z direction. A sinusoidal wave is drawn over the incident wave and refracted wave, to denote that the wave is propagating. There exists a critical angle, $\theta_c$, above which light from a higher index material does not propagate into the lower index material but instead undergoes total internal reflection as shown by rays 115 and 142 in FIGS. 1E and 1B, respectively.

When light incident to a surface undergoes total internal reflection, as illustrated in FIG. 2B, there exists a propagating reflected travelling light wave 212, as well as an evanescent field 211 that penetrates into the lower index material. The evanescent field 211 contains but does not propagate energy and attenuates exponentially away from the interface. The evanescent field is measurable and is utilized in near-field measurements such as total-internal-reflection-microscopy. FIG. 2C illustrates the average light intensity through the interface. In the higher index $n_1$ region, assuming no loss, the intensity of the propagating wave is constant. In the lower index region $n_2$, however, the intensity decays to immeasurable levels, within a few wavelengths from the interface.

If another higher index material is placed very close (within a few wavelengths) to the interface, energy can be coupled or 'tunneled' across a thin low index region. This is referred to as "near-field coupling" and illustrated in FIGS. 2D and 2E. A propagating wave 241 strikes the interface between $n_1$ (201) and $n_2$ (202) at an incident angle greater than the critical angle. An exponentially decaying evanescent field is created in $n_2$ (202). If the second higher index material $n_3$ (203) is placed close enough, typically within a wavelength, such that the evanescent field 242 has not attenuated completely, then some of the energy will enter $n_3$ through which it will propagate as a travelling wave 243. FIG. 2E illustrates that the average intensity in $n_3$ is the same as the energy in the evanescent field at the $n_2$ to $n_3$ interface but less than the average intensity in $n_1$. This is how high angle light can be propagated across a low index interface where it would have normally undergone total internal reflection. Geometric lenses typically cannot be placed close enough to a surface emitter to allow near-field coupling and therefore, unlike the present invention, cannot utilize energy contained in the near-field.

The present invention utilizes a patterned nano-structure which acts as a compact lens to efficiently collimate the otherwise spread emission from a light emitting surface, by coherently scattering high-angle light in the forward direction, and by utilizing energy contained in the near-field, both of which are wasted with geometric lenses. The nano-structure is preferably transparent with low absorption loss, and is at least a few wavelengths in thickness, to fully interact with the light. A patterned nano-structure that is many wavelengths thick, however, will result in the pillars (or holes in a slab), or scattering centers, having a large aspect ratio which may be difficult to manufacture. By first placing the nano-structured lens within a few wavelengths of the light emitting surface, high-angle light which would normally have undergone total internal reflection can be coupled into the lens, as explained above. Within the nano-structured lens, the regular-patterned scattering centers impart a momentum change to high angle light which redirects them in the desired forward direction.

FIGS. 3A-3C and 4A-4C illustrate several embodiments of the present invention. As an example, FIG. 3A illustrates the top of a nano-structured lens 300 with high index cylindrical pillars 302 arranged in a triangular 2D lattice, although other pillar geometries such as ovals, and lattices such as rectangular 2D, can be used as well. The pillars may comprise silicon, semiconductor materials, liquid crystal materials, metal oxides or polymers. The shaded regions represent higher index of refraction. The non-shaded region may be a gaseous medium such as air or a material of lower index of refraction than that of the pillars 302, such as a gel.

The triangular lattice is defined by two lattice vectors $\vec{a}_1$ and $\vec{a}_2$ in real space.

FIG. 3B1 illustrates the lattice vectors and FIG. 3B2 illustrates the reciprocal vectors from the triangle lattice in FIG. 3A. The momentum given by the lattice structure represented by vectors $\vec{a}_1$ and $\vec{a}_2$ in FIG. 3B1 is from the reciprocal lattice vectors $\vec{b}_1$ and $\vec{b}_1$ which are, in essence, the Fourier Transform of the lattice vectors and their representation in momentum space, as shown in FIG. 3B. The view shown in FIG. 3A would be the preferred orientation to collimate light travelling in or out of the page. In this orientation, the momentum imparted by the nano-structured lens and given by the reciprocal lattice vectors reduces or cancels the transverse (perpendicular to propagation) momentum vector of the light wave. The strength of the momentum change imparted by the nano-structured lens $\vec{b}$ depends on the lattice spacing or pitch as well as the regularity of the lattice. A more regular and repeated pattern will exhibit more coherence scattering and hence a larger momentum. The actual shape of the pillars is less important than the periodicity.

FIG. 3C is a cross-sectional view of the lens 300 in FIG. 3A taken along the line 3C-3C in FIG. 3A. FIG. 3C shows an oval shaped tapering along the thickness of the slab d, while still maintaining the same overall lattice constant, which is typically a fraction of a wavelength. Other pillar shapes are within the scope of the present invention.

Figure 4B:
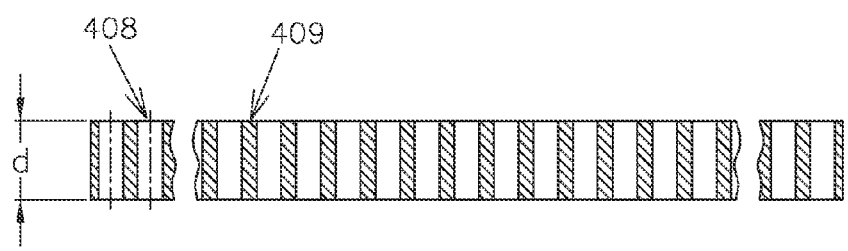
FIG. 4B is a cross-sectional view of FIG. 4A taken along the line 4B-4B of FIG. 4A. In a slightly different embodiment as shown in FIG. 4C, the low index pillars or holes do not penetrate all the way through the higher index material, such as when the higher index material is etched, but not all the way through the higher index material, leaving in place a bottom thin layer of the higher index material.
Figure 4C:
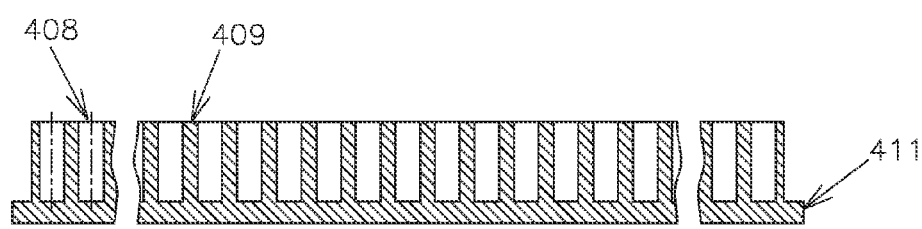

In FIGS. 4A and 4B, the holes 401 in the slab 400 may be filled with a lower index material (e.g. gel) or by a gaseous medium such as air, and the cross-section of the holes have a uniform shape so that the holes are not tapered (for illustration purposes), throughout the thickness of the slab d. Obviously, holes that are not so shaped can also be used and are within the scope of the invention. The slab 400 may comprise silicon, semiconductor materials, liquid crystal materials, metal oxides or polymers. Other hole shapes are still within the scope of the present invention. As in the embodiment of FIGS. 3A, 3B1, 3B2, the reciprocal vectors of the lattice vectors $\vec{a}_1$ and $\vec{a}_2$ labeled 403 in FIG. 4A impart a momentum change to high angle light which redirects them in the desired forward direction which is into or out of the page.

In the present invention, the operating wavelength range is preferably from ultra-violet, through the visible range, to near-infrared, spanning from about 300 nanometers to 2 micrometers (2,000 nanometers). The terms "light" and "radiation" include electromagnetic radiation having wavelengths in this range and are used interchangeably herein. Wavelengths outside this preferred range are also applicable to the present invention, as long as the nano-structured slab has sufficiently low absorption loss, and the index contrast between the pillars and surrounding material is sufficiently high. The actual wavelength range of each nano-structured lens will depend on its lattice constant, and the lens may have a 100 nm bandwidth for the light that it scatters and redirects in the forward direction. Thus, the lattice constant may be chosen for the desired operating wavelength range within the broad range of 300 nanometers to 2 micrometers.

The nano-structured lens in FIGS. 3A-3C and 4A-4C can be fabricated by commonly used methods in nano-technology, for example, electron-beam lithography and photolithography and the use of nano-imprinting, either to define the patterns first, and then etch the unwanted portions, or else to grow the pillars layer by layer on nucleation centers defined by nano-patterns.

Figure 5A:
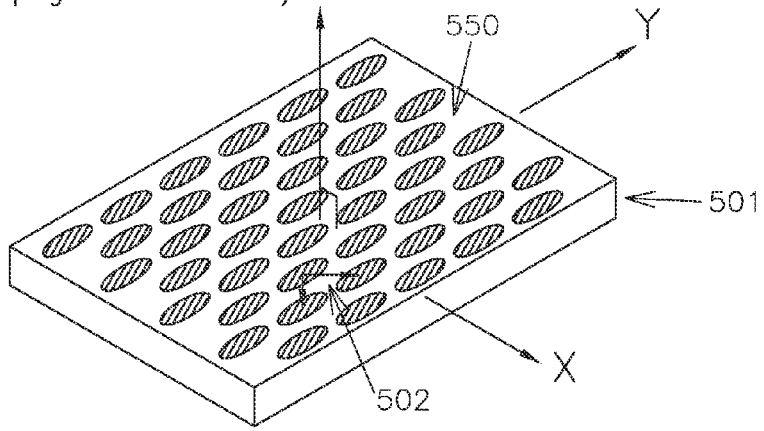
FIGS. 5A through 5D illustrate the principle of the present invention. The periodic patterned structure of the nano-structured lens imparts a momentum change to incoming rays which, according to conservation of energy, can scatter them towards the desired propagation direction, z.
Figure 5B:
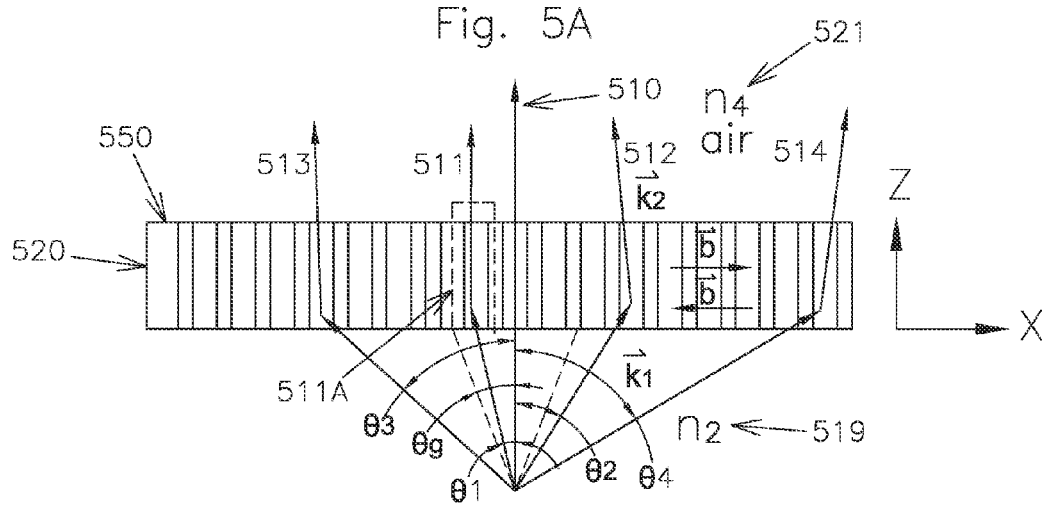
Figure 5C:
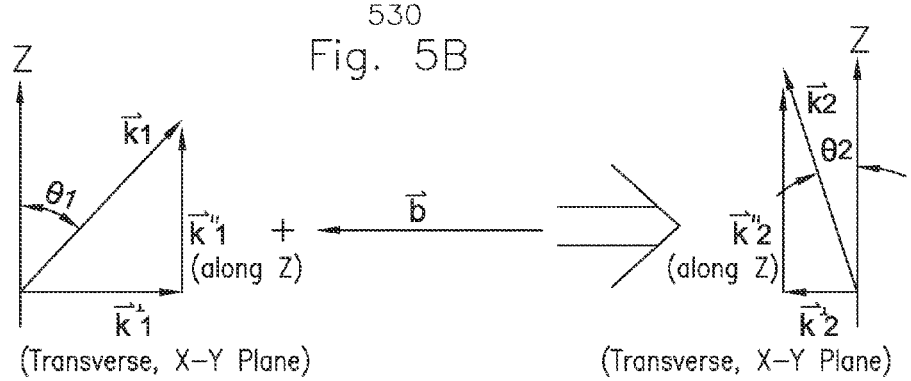
Figure 5D:
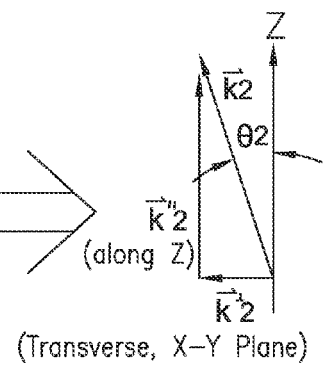

FIGS. 5A-5D illustrates in more detail how the nano-structured lens, when oriented with the lattice perpendicular (or close to perpendicular) to the light propagating direction z, can scatter high-angle light in the forward direction and improve collimation. FIG. 5A is a perspective view of the nano-structured lens 501 with lattice vectors 502, and illustrates the preferred orientation relative to light travelling in the z direction. FIG. 5B illustrates how incoming light is scattered by the nano-structured lens. FIG. 5C shows, mathematically, the reciprocal lattice vector of the regularly patterned nano-structure of FIGS. 5A and 5B being added to the wave vector of the incident wave. FIG. 5D indicates the resulting wave vector from FIG. 5C, in which the light is more collimated than it was before passing through the nano-structured lens.

FIG. 5B shows examples of how the nano-structured lens 501 of FIG. 5A affects light from a point light source 530, embedded in a medium 519 with index $n_2$, entering the lens at different angles. A surface emitter can be modeled as many point light sources uniformly spreading over a nearly flat or slightly curved surface. Zero-degree incident light 510 along the z axis and light with slightly higher but still small angle $\theta_1$ to the z axis, propagate along the thickness or length of the nano-structured lens and perpendicular to the pattern, in confined index-guided modes before exiting and propagating to the far-field 511, in a medium 521 with index $n_4$. In this example, medium 521 with index $n_4$ is air. Other low index media for $n_4$, such as polymer gel, are also applicable to the present invention. These small-angle modes that have incident angle less than $\theta_g$ are referred to as "index-guided modes", as they are confined in the x-y direction by the index contrast. The value of $\theta_g$ depends primarily on the lattice structure, the refractive indices of the lens material, and the wavelength of the incident waves. Thus, once the above mentioned three quantities are selected, the value of $\theta_g$ is predetermined.

It is noted that the quantity $\theta_g$ is different from the critical angle ($\theta_c$ of FIG. 2B) which is a function of the indices of refraction of the medium 521 and of the lens. The momentum change described below for light incident at higher angles to the z axis is caused by the scattering of such light by the nano-structured lens 501.

For higher angles beyond the maximum index guided angle $\theta_g$, such as $\theta_2$, $\theta_3$ and $\theta_4$, there is a dramatic momentum change from incident $\vec{K}_1$ to exiting $\vec{K}_2$, due to scattering off the lattice. This is mathematically described in FIGS. 5C and 5D. The reciprocal lattice vector $\vec{b}$ is added to the incident light's momentum $\vec{K}_1$. In the preferred orientation, $\vec{b}$ is parallel to the transverse light component $\vec{K}_1^\perp$ and reduces it. By conservation of energy, $|\vec{K}_2|=|\vec{K}_1|$, and therefore the reduction of the transverse momentum component serves to increase the resulting momentum along the propagation direction z. This is illustrated in FIGS. 5C and 5D, with $|\vec{K}_2^\perp|<|\vec{K}_1^\perp|$, $|\vec{K}_2^\parallel|>|\vec{K}_1^\parallel|$, and $\theta_2<\theta_1$.

The nano-structured lens 501 with lattice vectors 502 is periodic in two different directions in the xy plane 550 shown in FIGS. 5A, 5B. The index guided angle $\theta_g$, is defined as the angle from a line normal to the plane 550, which line may be the z-axis. Thus, in this context, radiation incident on lens 501 within the angle $\theta_g$ such as radiation 511 will be transmitted by the lens in the index-guided mode, and at least some of the radiation incident on lens 501 outside the angle $\theta_g$ from the z axis, such as radiation 512, 513 and 514, will be scattered and redirected by lens 501 in the forward direction.

While nano-structured lens 501 with lattice vectors 502 is periodic in two different directions, it will be understood that this is not required, and a nano-structured lens that is periodic in a single direction can also be used to redirect high incidence angle radiation to the forward direction. For example, if nano-structured lens 501 were only periodic along the x direction, a maximum index guided angle $\theta_g$ may be defined in x-z plane. This embodiment resembles a 'cylindrical lens' in which light is collimated only along one direction. In this instance, there will be one instead of two lattice vectors, and this one lattice vector will cause a corresponding reciprocal lattice vector to be added to the incident light's momentum, thereby causing a reduction of the transverse momentum component in the x-direction and an increase in the resulting momentum along the propagation direction z. The one dimensional periodic structure will then cause radiation incident on the lens having angle component in x-z plane outside the angle $\theta_g$ from the z axis to be scattered and redirected in the forward direction, and transmit the radiation incident on the lens within the angle $\theta_g$ in the index-guided mode.

Figure 6A:
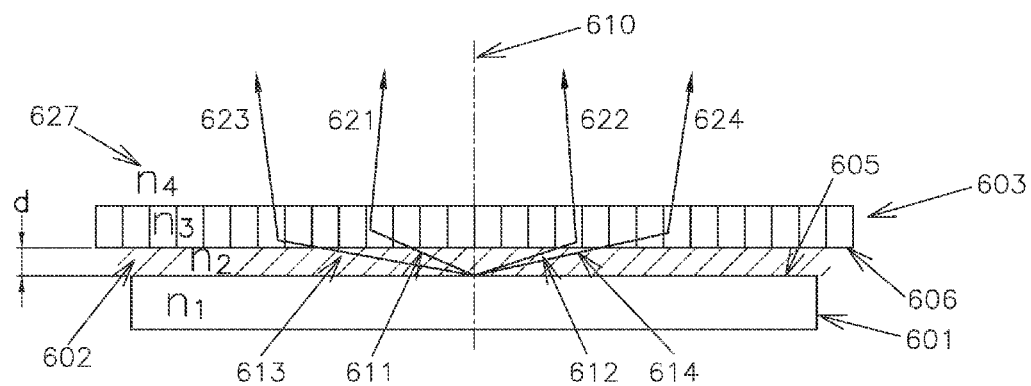
FIGS. 6A-6E show several embodiments of the present invention.
Figure 6B:
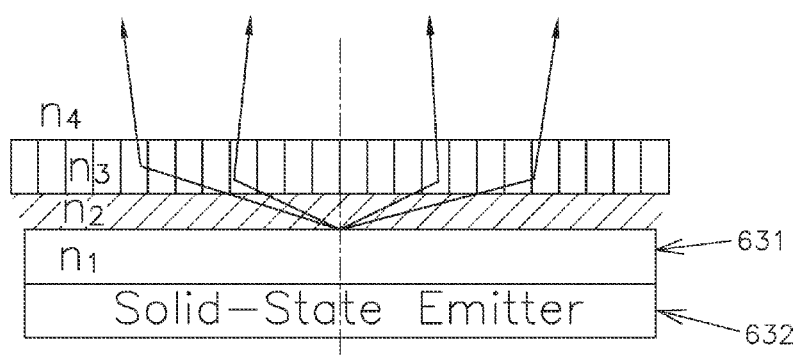
Figure 6C:
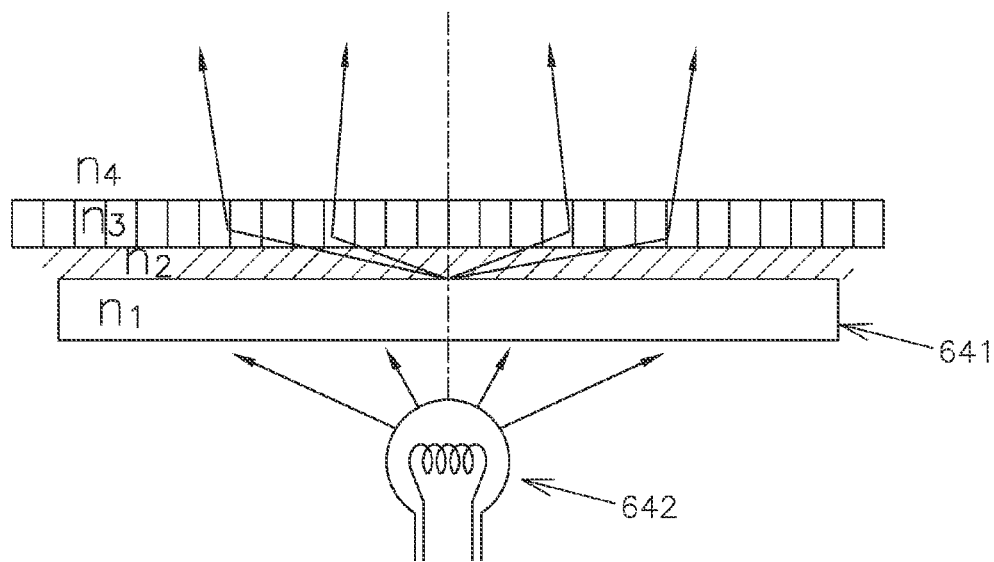
Figure 6D:
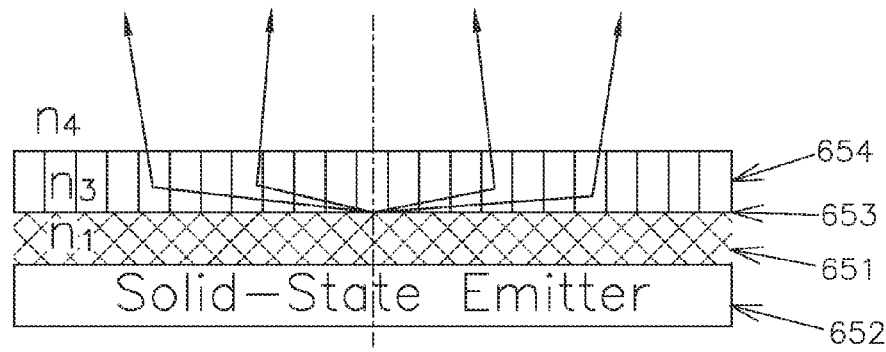
Figure 6E:
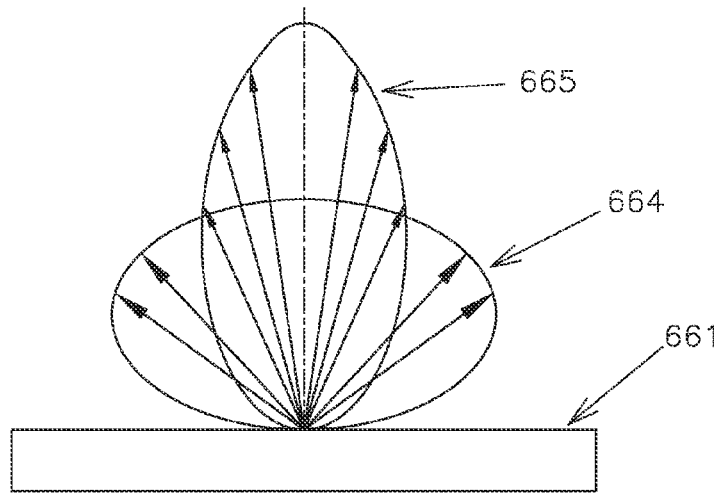

FIGS. 6A-6E illustrate several embodiments of the present invention in which the nano-structured lens is fabricated separately, and placed in close or physical contact with light emitting surface. FIGS. 6A through 6D are cross-sectional views and oriented such that the light propagation direction is upwards. FIG. 6E illustrates the broadly spread intensity profile 664 of a light emitting surface 661 without a nano-structured lens and the narrower, more collimated profile 665 with the use of a nano-structured lens.

FIG. 6A is a cross-sectional view of an embodiment which depicts generally how the nano-structured lens is juxtaposed to an arbitrary surface light emitter such as an LED. In FIG. 6A, light waves 611 through 614 emitted from light emitting surface 605 are collimated (621 through 624) by the nano-structured lens 603. In order to efficiently couple the near-field energy including the evanescent field, so as to increase light extraction from the light emitter, the nano-structured lens 603 with effective index $n_3$ is brought within a close distance d to the light emitting surface 605 of a light-emitting device 601 with effective index $n_1$. The separation d between light emitting surface 605 and lens 603 can range from a few atomic/molecular mono-layers to several optical wavelengths (e.g. up to less than 10 times the wavelengths), but should ideally be as close as practically and/or technically possible. The material of index $n_2$ (602) can be air, or preferably a transparent high index material such as silicone gel mixed with high-index semiconductor nano-particles such as GaAs or CdS, for example. A higher index $n_2$, close to $n_1$ and $n_3$, will increase index matching, thus enhancing evanescent field coupling to the lens 603, and minimizing interface reflections. Thus, preferably $n_2$ differs from $n_1$ and $n_3$ by not more than 0.5. Preferably also, the indices are chosen such that $n_1 \geq n_2 \geq n_3$, to have optimal energy coupling and light collimation.

The materials of solid-state emitters are typically compound semiconductors that have high refractive index values, ranging from 2.3 to 3.6. In order to make $n_2$ close to $n_1$, a high concentration of high-index nano-particles is employed in the silicone mixture. Preferably the refractive index of such nano-particles is not less than 2. Semiconductor materials can also be chosen for making the nano-structured lens 603, as long as its band gap energy is more than the energy of radiative photons, for low absorption loss.

FIGS. 6B and 6C show two embodiments of the present invention in which a phosphor layer (631 in FIG. 6B, and 641 in FIG. 6C) is activated by a solid-state emitter 632 and lamp 642, respectively, and acts as the emitting surface whose light the nano-structured lens collimates. Solid-state emitters include but are not limited to LEDs, OLEDs and solid-state lasers. Lamps include but are not limited to xenon and mercury arc lamps and halogen lamps.

Mixing phosphors or other types of light emitting particles in a transparent high index material such as gel such that the phosphors or other particles can physically contact the nano-structured lens is also within the scope of the present invention. FIG. 6D illustrates an example of this case where a phosphor, silicone gel mixture 651 of index $n_1$ separates and physically contacts the solid-state emitter 652 and nano-structured lens 654. The thickness of phosphor mixture 651 is chosen to substantially absorb the radiation from the emitter 652, although in some cases it may be desirable for a portion of the radiation from emitter 652 to pass through the transparent gel in phosphor mixture 651. The top surface 653 of the phosphor mixture 651 then acts as the light-emitting surface.

Figure 7:
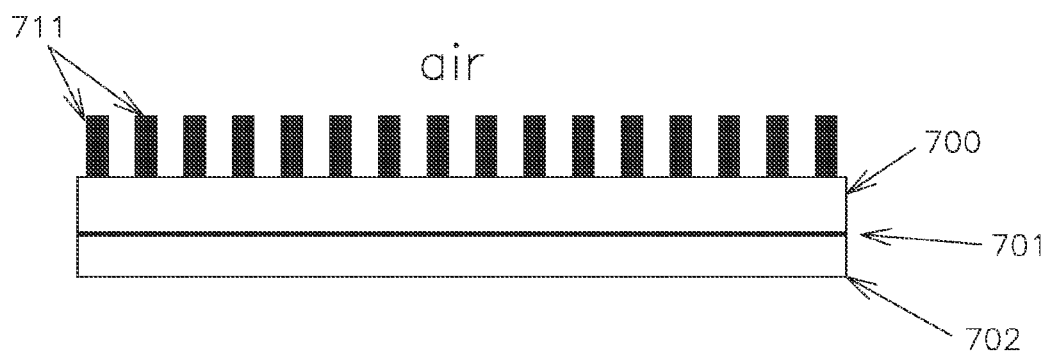
FIG. 7 is a cross-sectional view illustrating a method for producing a nano-structured lens used in the present invention. Nano-scale patterned columns are grown, layer-by-layer, directly onto a p-n junction light emitter to form a nano-structured lens.

FIGS. 6A-6E illustrate several embodiments where the nano-structured lens is fabricated separately and then brought into close contact with the light emitting surface. The lens, however, can also be fabricated or grown directly on the light emitting surface, as shown in FIG. 7. In this example, high index pillars 711 are fabricated on top of a p-n junction light emitter composed of n-type semiconductor material 700, p-type material 702, and active layer 701. This can be done by first depositing nucleation centers with the desired lattice structure and then growing them, layer by layer, until they are the desired thickness.

Figure 8:
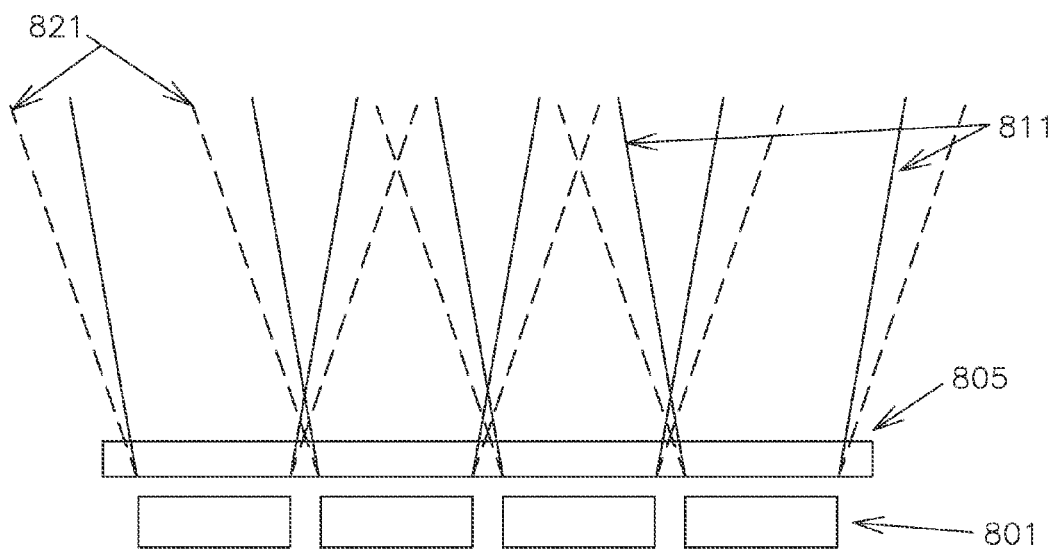
FIG. 8 is a schematic view of an array of four surface light emitters and a nano-structured lens collimating light from the emitters to illustrate another embodiment of the present invention.

The scope of the present invention extends to the use of one or several nano-structured lenses for one or multiple surface light emitters. FIG. 8 shows one embodiment where a nano-structured lens 805 is used to collimate the emissions from an array of surface emitters 801. The solid lines 811 and dashed lines 821 represent the collimated light profile versus the original spread profile, with and without the use of a nano-structured lens, respectively.

Figure 9:
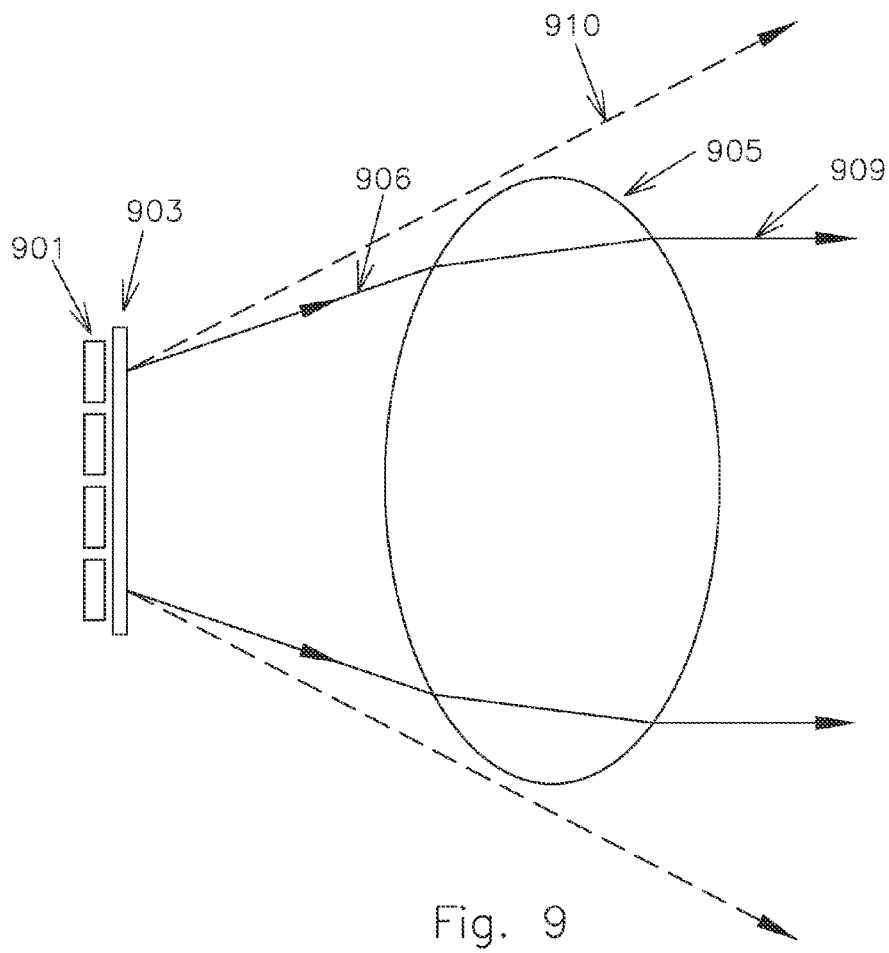
FIG. 9 illustrates the effect of the embodiment of FIG. 8 of the present invention and how collimating light prior to the use of further light modifiers such as refractive lenses can increase efficiency and reduce size.

Using additional optics such as geometric lenses to further collimate or shape the light distribution, after initial collimation by the nano-structured lens, is also within the scope of the present invention. As shown in FIG. 9, using the nano-structured lens 903 to first collimate the light 906, increases the amount of light 909 that is captured and collimated by the geometric lens 905 from surface emitters 901. Had the light not been first collimated and allowed to spread out, as shown by the dashed line 910, much of the light would not reach the object.

Figure 10A:
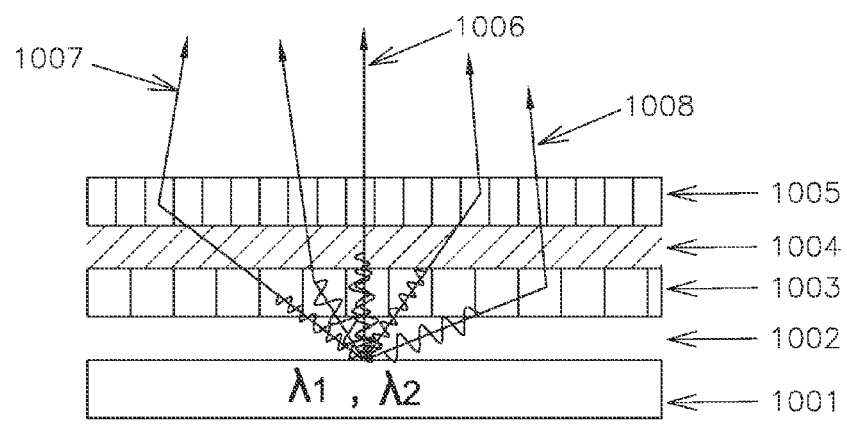
FIGS. 10A, 10B illustrate two other embodiments of the present invention where multiple nano-structured lenses of different lattice constants are used to collimate light composed of multiple wavelengths.

The lattice structure of a nano-structured lens can be optimized for collectively scattering light of a specific wavelength or wavelength range, and therefore multiple nano-structured lenses with different lattice structures can be used to collimate light composed of multiple wavelengths, or multiple wavelength ranges. FIG. 10A illustrates a stack of two nano-structured lenses 1005 and 1003 placed in a tandem arrangement with respect to the surface light emitting layer 1001 and with different lattice structures—each optimized for scattering either $\lambda_1$ or $\lambda_2$, as emitted from surface emitter 1001. In this illustration, shorter wavelength light 1007 is scattered more by nano-structured lens 1005 than 1003 and vice versa for longer wavelength light 1008. While nano-structured lens 1003 also scatters shorter wavelength light 1007, the amount of scattering is insignificant and is thus not illustrated in FIG. 10A. Similarly, longer wavelength light 1008 is scattered by nano-structured lens 1003 but only by an insignificant amount by lens 1005. The spaces 1004 and 1002 between the two lenses, and between the lower lens and surface emitter, respectively, can be any transparent material, but preferably a high index material is used, with index closely matched to both the surface emitter and lenses. In this illustration, the nano-structured lens 1003 optimized for longer wavelengths is placed closer to the light emitting layer than lens 1005 but the reverse (i.e. lens 1005 placed closer to the light emitting layer) and all other orderings are within the scope of the invention. While only two lenses 1003 and 1005 are illustrated in FIG. 10A, it will be understood that more than two lenses with different lattice constants may also be used, which is within the scope of the invention. This may be advantageous in case the light emitting layer emits light of more than two wavelengths. In such event, each of the lenses may be used to scatter and redirect light of a corresponding wavelength from the light emitting layer.

Figure 10B:
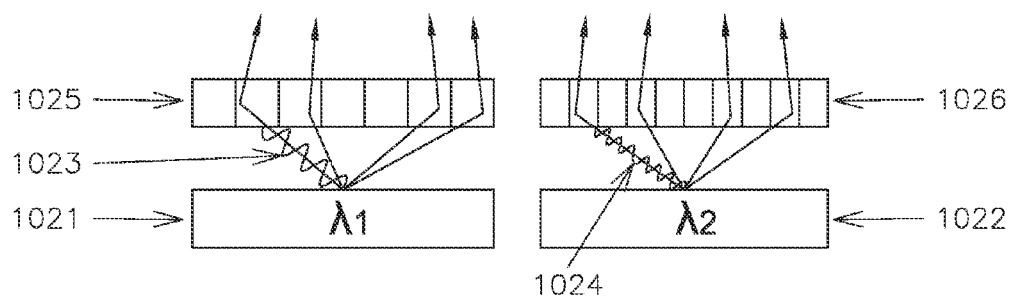

FIG. 10B shows an embodiment where an array of nano-structured lenses 1025 and 1026 placed side by side is used to collimate light from an array of surface emitters 1021 and 1022 with different wavelengths. In this example, nano-structured lens 1025 is designed to collimate $\lambda_1$ (1023) from adjacent corresponding surface emitter 1021, and nano-structured lens 1026 is designed to collimate $\lambda_2$ (1024) from adjacent corresponding surface emitter 1022. The use of additional collimating or light mixing elements, if necessary, is also within the scope of the present invention. While only two lenses 1025 and 1026 are illustrated in FIG. 10B, it will be understood that more than two lenses with different lattice constants may also be used, which is within the scope of the invention. This may be advantageous in case there are more than two light emitting emitters emitting light of more than two wavelengths. In such event, each of the lenses may be used to scatter and redirect light of a corresponding wavelength from one of the light emitters.

While the invention has been described above by reference to various embodiments, it will be understood that changes and modifications may be made without departing from the scope of the invention, which is to be defined only by the appended claims and their equivalents.

The invention claimed is:
1. A light source for providing light, comprising:
a light emitting layer; and
a first lens comprising a periodic structure therein that is periodic along at least one direction in a plane, said periodic structure formed from at least two optically transparent materials of different optical indices, wherein said first lens is separated from the light emitting layer, and the radiation propagating from the light emitting layer within an angle to a line normal to the plane will be transmitted by the first lens to a far field in an index-guided mode, the separation between the light emitting layer and the first lens being such that near field radiation propagating from the light emitting layer towards the first lens not within said angle to the line will be scattered and redirected by the first lens to the far field to thereby collimate the radiation propagating from the light emitting layer to the far field.

2. The light source of claim 1, said light source further comprising a second layer between and separating the first lens and the light emitting layer.

3. The light source of claim 2, said light emitting layer having a first optical index value, said second layer having a second optical index value, and said periodic structure including a material having a third optical index value, wherein the first optical index value is greater than the second optical index value, and the second optical index value is greater than the third optical index value.

4. The light source of claim 2, said light emitting layer having a first optical index value, said second layer having a second optical index value, and said periodic structure including a material having a third optical index value, wherein the second optical index value is different from the first and third optical index values by not more than 0.5.

5. The light source of claim 4, said light emitting layer including a compound semiconductor material, wherein said second layer includes nanoparticles with optical index value of not less than 2.

6. The light source of claim 2, said second layer comprising a phosphor material that emits radiation in response to radiation from the light emitting layer.

7. The light source of claim 6, said second layer comprising a silicone gel material that forms a mixture with the phosphor material.

8. The light source of claim 7, said silicone gel material being transparent to radiation from the light emitting layer, so that at least some of the radiation from the light emitting layer not absorbed by the phosphor material passes through the second layer and reaches the far field.

9. The light source of claim 1, said periodic structure comprising a material with a band gap energy that is more than the energy of photons emitted by the light emitting layer.

10. The light source of claim 2, said second layer having a thickness less than 10 times the wavelength of the radiation emitted by the light emitting layer.

11. The light source of claim 1, said light emitting layer including a phosphor material, said light source further comprising a device providing radiation to the phosphor material, causing said phosphor material to emit radiation.

12. The light source of claim 11, said device comprising a lamp or a layer of light emitting material.

13. The light source of claim 1, said periodic structure redirecting radiation within a range of wavelengths including ultraviolet, visible and/or near infrared wavelengths.

14. The light source of claim 1, said periodic structure redirecting radiation having a bandwidth within a range of wavelengths from about 300 nanometers to 2 micrometers.

15. The light source of claim 1, said periodic structure comprising a slab of a first material having dispersed therein a periodic arrangement of a second material, said first and second materials having different optical indices.

16. The light source of claim 15, said second material comprising air or a gel having an optical index lower than that of the first material.

17. The light source of claim 15, said first material comprising silicon, semiconductor materials, liquid crystal materials, metal oxides or polymers.

18. The light source of claim 1, said periodic structure comprising pillars dispersed within air or a gel having an optical index material lower than that of the pillars.

19. The light source of claim 18, said pillars comprising silicon, semiconductor materials, a metal oxide or a polymer.

20. The light source of claim 1, said light emitting layer comprising a semiconductor material with light emitting diodes therein.

21. The light source of claim 1, further comprising a second lens that collimates the radiation that is redirected by the first lens with said periodic structure to the far field.

22. The light source of claim 1, said light emitting layer comprising an array of surface light emitters, said light source comprising an array of lenses, each with a periodic structure therein, each of the lenses of the array of lenses redirecting near field radiation from a corresponding one of the array of surface light emitters, after such radiation tunnels through a medium between the light emitting layer and the first lens, to the far field.

23. The light source of claim 1, said light emitting layer emitting radiation of at least two different wavelengths, said first lens causing scattering of a first one of the at least two wavelengths and insignificant scattering of a second one of the at least two wavelengths, said light source further comprising a second lens with a periodic structure that causes scattering of the second one of the at least two wavelengths and insignificant scattering of the first one of the at least two wavelengths.

24. The light source of claim 23, wherein said first lens and said second lens are placed in a tandem arrangement with respect to the light emitting layer, so that the radiation of the first and second wavelengths passes both lenses and is collimated towards the far field.

25. The light source of claim 24, said light emitting layer emitting radiation of more than two different wavelengths, said light source including more than two lenses placed in a tandem arrangement with respect to the light emitting layer, each of the two lenses placed in a tandem arrangement causing scattering of one of the more than two wavelengths and insignificant scattering of the remaining ones of the more than two wavelengths, so that the radiation of the more than two wavelengths passes each of the two lenses placed in a tandem arrangement and is collimated towards the far field.

26. The light source of claim 1, a first portion of said light emitting layer emitting radiation of a first wavelength, and a second portion of said light emitting layer emitting radiation of a second wavelength, wherein said first lens is located adjacent to the first portion to collimate radiation of the first wavelength towards the far field, said light source further comprising a second lens located adjacent to the second portion to collimate radiation of the second wavelength towards the far field.

27. The light source of claim 1, said periodic structure having a thickness not less than one wavelength of the radiation.

28. A light source for providing light, comprising:
a light emitting layer; and
a lens comprising a second layer in close proximity to the light emitting layer and with a periodic structure therein that is periodic along at least one direction in a plane, said structure comprising at least two optically transparent materials of different optical indices, one of said at least two optically transparent materials forming an array of scattering centers arranged in a regular pattern in the second layer, wherein the radiation propagating from the light emitting layer within an angle to a line normal to the plane will be transmitted by the second layer to a far field in an index-guided mode, and near field radiation propagating from the light emitting layer towards the second layer not within said angle to the line will be scattered and redirected by the array of scattering centers in the lens to the far field to thereby collimate the radiation propagating from the light emitting layer to the far field, wherein a collective interference light pattern is formed in the far field by said near field radiation, said pattern created by scattering from the array of scattering centers.

29. A method for collimating light to a far field, comprising:
providing a first layer with a periodic structure therein that is periodic along at least one direction in a plane, said structure comprising at least two optically transparent materials of different optical indices, one of said at least two optically transparent materials forming an array of scattering centers arranged in a regular pattern in the first layer; and
propagating radiation towards the first layer from a light source in close proximity to the first layer, so that the radiation propagating within an angle to a line normal to the plane towards the first layer will be transmitted by the first layer to the far field in an index-guided mode, and near field radiation propagating not within said angle to the line towards the first layer will be scattered and redirected by the array of scattering centers in the first layer to the far field to thereby collimate the near field radiation to the far field, said near field radiation forming in the far field a collective interference light pattern.

30. The method of claim 29, wherein the radiation propagating towards the first layer passes through a second layer before reaching the first layer.

31. The light source of claim 28, wherein the periodic structure is optimized for collectively scattering light of a specific wavelength or wavelength range.

32. The light source of claim 28, wherein one of said at least two optically transparent materials forms an array of holes through the second layer or pillars in the second layer.

* * * * *